(No Model.) 4 Sheets—Sheet 4.
H. C. COOK.
MACHINE FOR MAKING CORSET STAYS.
No. 514,213. Patented Feb. 6, 1894.
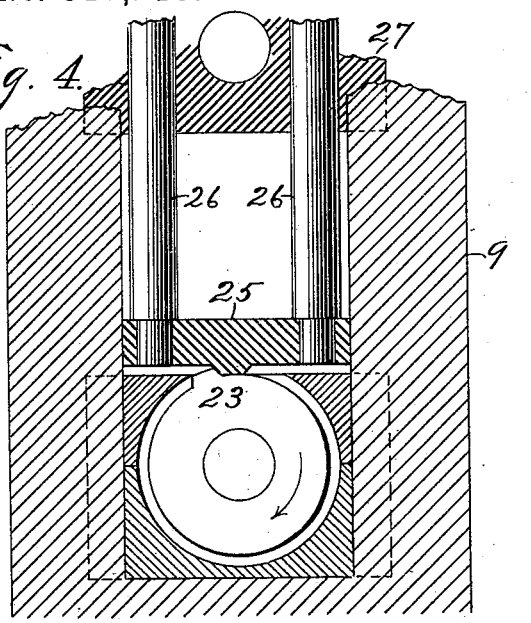
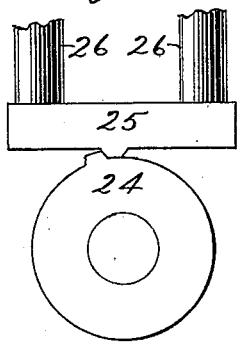
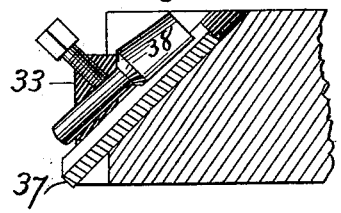
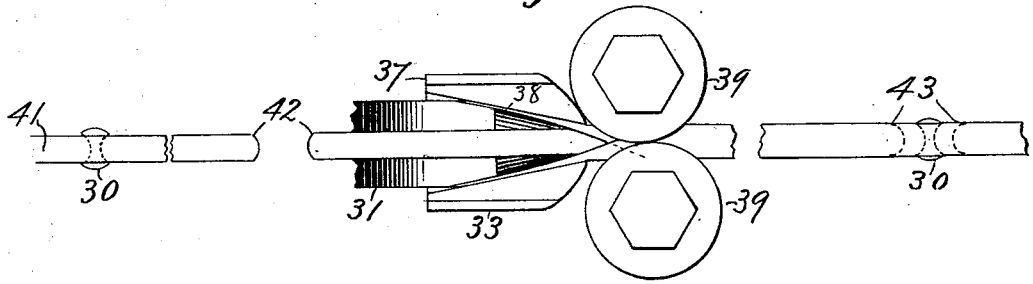
Witnesses
A. W. Stipek,
F. H. Griswold.
Inventor
Henry C. Cook.
By James Shepard
Atty.

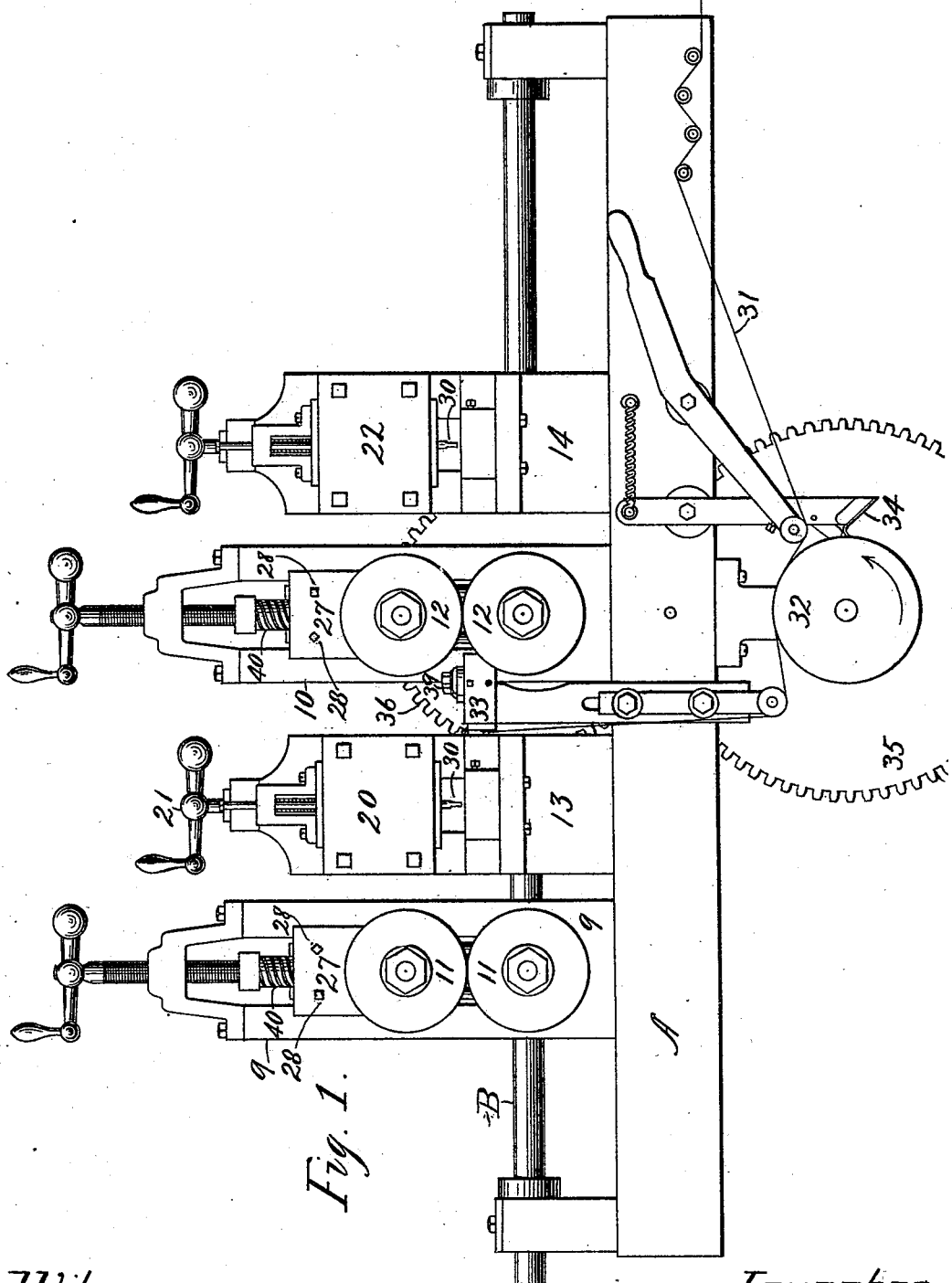

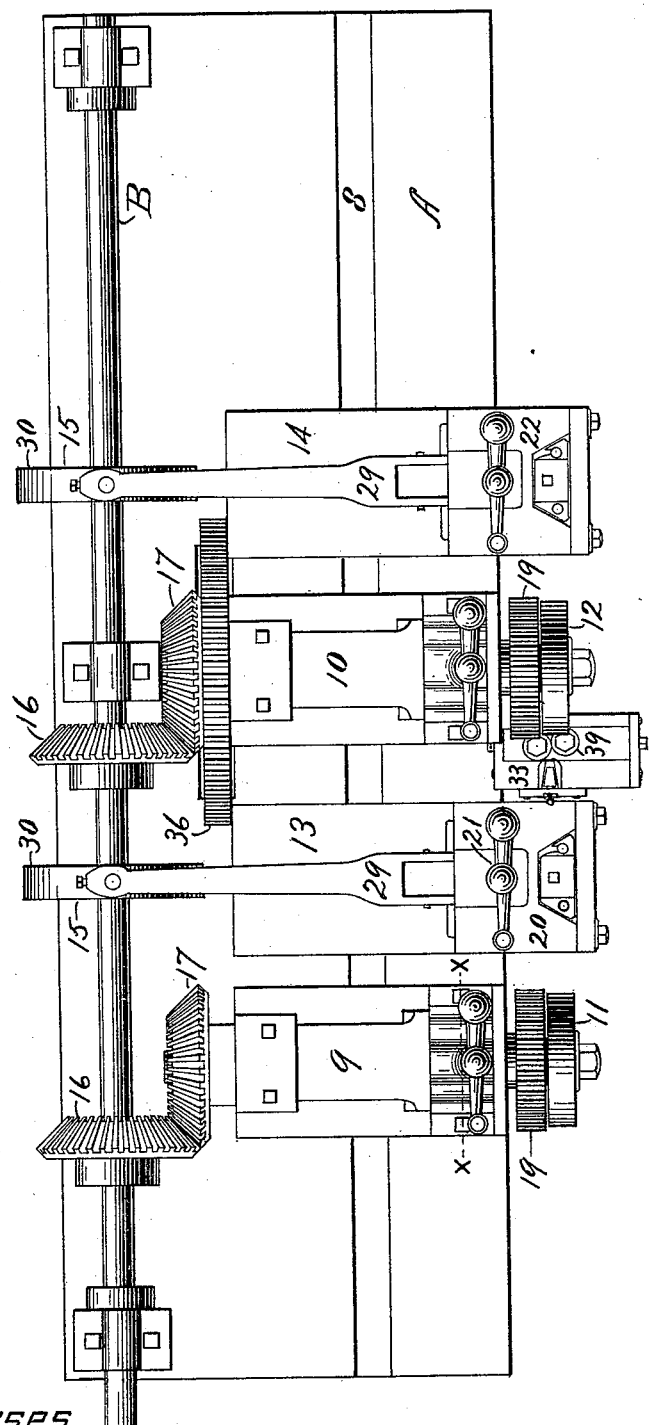

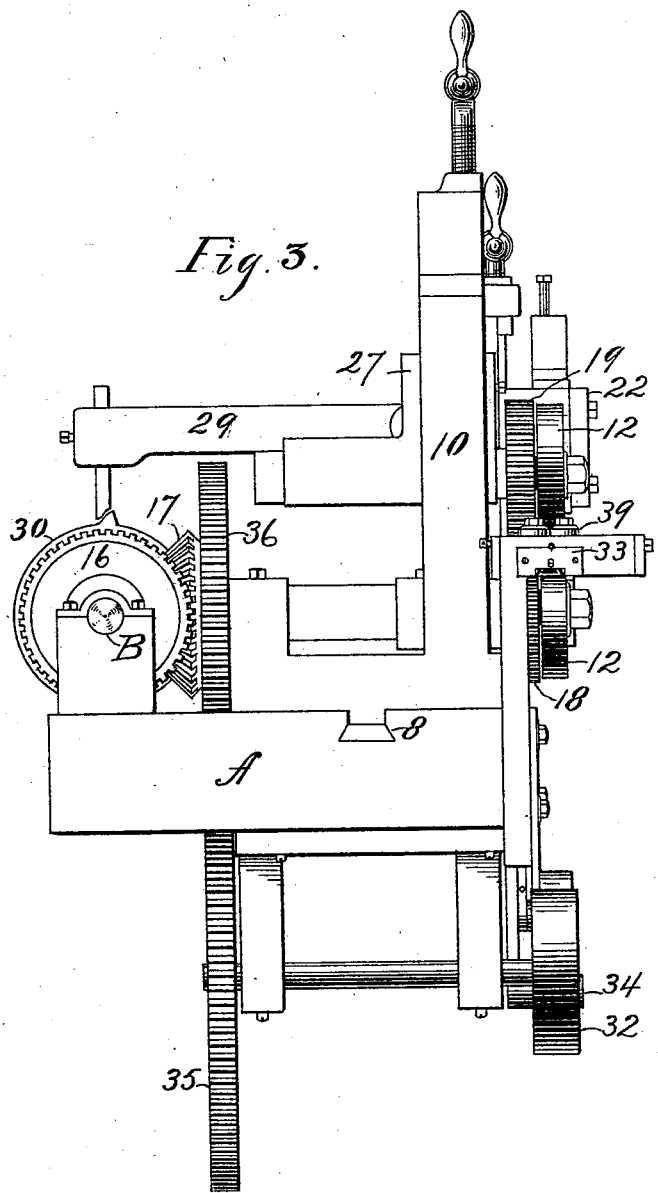

UNITED STATES PATENT OFFICE.

HENRY C. COOK, OF ANSONIA, CONNECTICUT.

MACHINE FOR MAKING CORSET-STAYS.

SPECIFICATION forming part of Letters Patent No. 514,213, dated February 6, 1894.

Application filed July 21, 1893. Serial No. 481,087. (No model.)

*To all whom it may concern:*

Be it known that I, HENRY C. COOK, a citizen of the United States, residing at Ansonia, in the county of New Haven and State of Connecticut, have invented certain new and useful Improvements in Machines for Making Corset-Stays, of which the following is a specification.

My invention relates to improvements in machines for making corset stays, and the chief object of my improvement is to produce a machine that is simple and free from complicated parts and which at the same time is efficient and rapid in action.

In the accompanying drawings: Figure 1 is a front elevation of my machine. Fig. 2 is a plan view of the same. Fig. 3 is an end view of the same with the first pair of rollers and press removed in order to more clearly show the folder. Fig. 4 is a somewhat enlarged detached section on the line $x\ x$ of Fig. 2, some of the parts being shown in elevation. Fig. 5 is a detached front elevation of one of the lifting cams and part acted upon by the same. Fig. 6 is a still further enlarged vertical section of the folder, some of the parts being shown in elevation, and Fig. 7 is a diagram illustrating the action of the machine upon the work.

A designates the bed or main frame of the machine which is provided with longitudinal ways 8. Upon the frame and connected with said ways I mount the frames 9, 10 for the two pair of feed rollers 11 and 12 and also the press carrying frames 13 and 14. I also mount upon said bed or frame the main shaft B which may be provided with any suitable driving pulley not shown and upon which shaft I mount the cams 15 and beveled gear 16, said beveled gear engaging like beveled gear 17 for driving the two pair of feed rollers 11 and 12. The lower shaft of each feed roller is provided with a gear 18 which engages with and drives corresponding gear 19 on the upper shafts of the feed rollers. Both pair of feed rollers are of the same size and are driven at the same speed so that they act alike in feeding the wire or steel along. Between the two pair of rollers is a cutting off mechanism in the form of a press 20 including a sub press frame, die bed, press slide and its operating lever all mounted upon the press carrying frame 13 so as to be vertically adjustable by turning the adjusting screw 21 in the same manner that analogous parts are adjusted upon the ways of a frame by means of a screw, whereby the press 20 may be adjusted vertically to bring the top of its cutting off die in alignment with the meeting edges of the feed rollers. A like press 22 is mounted upon the press frame 14 and made vertically adjustable in like manner. This press 22 and its frame 14 are also adjustable together upon the ways 8 in the longitudinal direction of the frame so as to bring the cut off punch and die at the desired distance from the adjacent pair of feed rollers. This adjustment may be effected in the same manner and by the same means that analogous parts are adjusted longitudinally on ways, as for example, the head and tail block of an engine lathe.

In the lower boxes of each of the feed rollers, I form a chamber or recess within which I arrange cams, the cam 23 for the first pair of feed rollers 11 being shown in Fig. 4, while the cam for the second pair of feed rollers 12 is shown in Fig. 5. At a point within the roller frame 9 just above this cam I arrange a cross arm 25 with a central downward projection and extending upwardly therefrom are vertical rods 26 which pass through holes in the upper box 27 of the feed rollers, which box may be adjusted and rigidly secured on said rods by means of the set screws 28 in Fig. 1, whereby when the cam 23 or 24 strikes the projection of the cross bars 25 the upper box 27 of the feed rollers is elevated to separate the feed rollers for a short time and permit them to continuously revolve without feeding the stock. The projection of the cam 23 that separates the first pair of rollers is somewhat longer than the corresponding projection of the cam 24 which lifts the second pair of feed rollers, whereby said second pair of feed rollers do not remain separated for so long a time as the first pair. The cams are so set in two pair of rollers that they are brought into action simultaneously.

Each press is provided with a lever 29 for actuating the slide which carries the punch 30 in the same manner that ordinary press slides are actuated, and I operate said levers by means of the cams 30 on the main shaft B. These cams are so set that they actuate the press slide during the time that the feed rollers are separated by means of the cams 23 and 24.

A strip of paper or covering 31 is shown in Figs. 1 and 7, the same extending over a paste roller 32, which is caused to revolve in a box of paste or gum (not shown) and thereby taking up and depositing the adhesive material on the strip of paper as it passes on its way to the folder 33. The surplus paste or adhesive material is scraped off from the roller 32 by means of the scraper 34. The paste roller 32 is caused to revolve by means of the gear 35 that is driven by the gear 36 on the lower shaft of the second pair of feed rollers.

The folder 33 may be of any ordinary construction, but the preferred construction is shown in Figs. 6 and 7 in which there is an oblique plate 37 having a tapering channel over one end of which is mounted the guard 38. Adjacent to this folder 33 is a pair of rollers 39 which are grooved upon their edges to receive the covered stay and assist in folding the covering thereon. Any other ordinary folder may be substituted for that which I have shown and described. As in analogous machines of this kind, the upper feed roller is made vertically adjustable in the usual manner and is held down to its work by means of springs 40, Fig. 1.

The cut off punch 30 and its die may be of any desired shape, but the preferred form of this punch is shown in Fig. 7.

A continuous strip of flat wire or steel is designated by the reference figure 41 in Fig. 7. Such a strip is passed through the first pair of feed rollers 11 and under the punch 30 of the first press 20 and the cam 23 acts to separate said feed rollers and stop the steel from being fed along while the cam 30 on the main shaft then acts to cut the steel in two by cutting out a portion of the metal and leaving the wire so cut on each side thereof with rounded ends.

In starting the machine, the piece first cut off may be run to waste. As the cam 23 passes out of action and permits the feed rollers to operate again, the wire is fed through the paper folder and to the second pair of feed rollers, whereby the wire is not only fed along but covered by the strip 31 being folded over the same in passing through the rollers. The action of the cams 23 and 24 then separates both pair of rollers to throw them out of action. Meanwhile both press slides are actuated through the cams 30 to cut the paper from the end which projects through the second pair of feed rollers and at the same time to cut the wire or stock at the point between the two pair of feed rollers, thereby cutting off the proper length for a corset stay. The cam for the second pair of rollers first goes out of action and thereby said second pair of rollers begin to feed a little before the first pair start so that the adjoining ends of the wire are separated from each other a greater distance than the width of the piece of metal cut out as shown by the space between the two ends 42 in Fig. 7. The piece thus cut off and the main portion of the stock as thus separated then travel along together and the gap between them is covered with a covering material as the stock passes through the folder and it is pressed down by the second pair of feed rollers. The connecting portion of the covering material is then severed as shown at 43 in Fig. 7, the punch 30 acting to cut the covering only leaving a slight portion of the cover projecting beyond the ends of the steel, said ends being indicated in Fig. 7 by the broken lines on each side of the punch 30.

In order to adjust the machine for different lengths, it is only necessary to remove the feed rollers and their connecting gear and substitute rollers and gears of another size, the upper shaft of the rollers being vertically adjustable to compensate for different sized rollers. The presses 20 and 22 may be then readjusted vertically to bring the cutting face of their dies in alignment with the meeting edges of the rollers and the press 22 and its frame 14 may be adjusted longitudinally upon the main frame or bed A to bring it to the proper point for cutting in the middle connecting cover, as shown at 43 in Fig. 7.

The term vertical is herein used with reference to the position of the machine as illustrated in the drawings.

While I have described the preferred form of mechanism for separating the feed rollers and the mechanism for cutting off the stock, it is evident that equivalent mechanism therefor may be employed without departing from my invention. By thus mentioning these parts I do not wish to imply any exception as to the law of equivalents with reference to other parts, the detailed description of the several parts having been made for the purpose of enabling a mechanic to construct the part, combination, or improvement that is pointed out in each claim.

While any known means or devices for separating the feed rollers will answer the purposes of the general combination, the particular mechanism shown has the advantage of quick and efficient action and of being used with different sizes of feed rollers.

I claim as my invention—

1. The combination of the feed rollers, their shafts, and feed roller frame with the box for the lower shaft chambered or recessed as described, a cam on the lower feed roller shaft within the chamber of said box, the cross bar 25 over said cam, the upper feed roller box 27 and connecting devices between said cross bar and upper box, substantially as described and for the purpose specified.

2. The combination of a first and second pair of feed rollers, a cutting off mechanism arranged between said two pair of feed rollers and mechanism for simultaneously separating both pair of feed rollers during the operation of said cut off, substantially as described and for the purpose specified.

3. The combination of two pair of feed rollers acting to feed the work at the same speed, a cutting off mechanism, mechanism for simultaneously separating both pair of said feed rollers and for holding the first pair of said rollers apart for a longer time than that which said second pair of rollers are held apart, substantially as described and for the purpose specified.

4. The combination of a pair of feed roller shafts, means for relatively adjusting said shafts vertically to accommodate different sizes of feed rollers, a press carrying frame adjacent to said feed roller shafts, a cutting off press including a sub frame, die bed and press slide, all mounted on said press carrying frame, means for adjusting said press bodily in a vertical direction to bring the top of the cutting off die into alignment with the meeting edges of the feed rollers substantially as described.

5. The combination of a bed or frame, two pair of feed rollers mounted thereon, a cutting off mechanism mounted between said two pair of feed rollers and a second cutting off mechanism mounted in longitudinal ways of said bed or frame for being adjusted thereon to and from said feed rollers, substantially as described and for the purpose specified.

6. The combination of the two pair of feed rollers, the two cutting off mechanisms, the covering folder and mechanism for separating said feed rollers and holding them separated for different times, substantially as described and for the purpose specified.

HENRY C. COOK.

Witnesses:
EGBERT BARTLETT,
LEWIS I. COOK.